United States Patent
Cheng et al.

(10) Patent No.: US 8,432,362 B2
(45) Date of Patent: Apr. 30, 2013

(54) KEYBOARDS AND METHODS THEREOF

(75) Inventors: Shang-Che Cheng, Saratoga, CA (US); Chia-Ming Lin, Taipei (TW)

(73) Assignee: ICE Computer, Inc., Saratoga, CA (US)

( * ) Notice: Subject to any disclaimer, the term of this patent is extended or adjusted under 35 U.S.C. 154(b) by 215 days.

(21) Appl. No.: 13/041,061

(22) Filed: Mar. 4, 2011

(65) Prior Publication Data

US 2011/0216007 A1  Sep. 8, 2011

Related U.S. Application Data

(60) Provisional application No. 61/311,365, filed on Mar. 7, 2010, provisional application No. 61/311,369, filed on Mar. 7, 2010.

(51) Int. Cl.
*G06F 3/02* (2006.01)
*G09G 5/00* (2006.01)

(52) U.S. Cl.
USPC ......... 345/168; 345/156; 345/176; 340/407.2

(58) Field of Classification Search .................. 345/156, 345/168, 169, 171–173, 177; 178/18.01, 178/19.01; 340/407.1, 407.2; 200/512
See application file for complete search history.

(56) References Cited

U.S. PATENT DOCUMENTS

| | | | |
|---|---|---|---|
| 6,822,635 B2 * | 11/2004 | Shahoian et al. | 345/156 |
| 2003/0095105 A1 * | 5/2003 | Vaananen | 345/168 |
| 2004/0104942 A1 * | 6/2004 | Weigel | 345/773 |
| 2008/0167014 A1 * | 7/2008 | Novick et al. | 455/413 |
| 2009/0225035 A1 * | 9/2009 | Baik | 345/173 |
| 2009/0231291 A1 * | 9/2009 | Ko et al. | 345/173 |
| 2009/0237359 A1 * | 9/2009 | Kim et al. | 345/168 |
| 2009/0295750 A1 * | 12/2009 | Yamazaki et al. | 345/173 |
| 2010/0109999 A1 * | 5/2010 | Qui | 345/156 |
| 2011/0050576 A1 * | 3/2011 | Forutanpour et al. | 345/168 |

* cited by examiner

*Primary Examiner* — Joe H Cheng
(74) *Attorney, Agent, or Firm* — Edward C. Kwok; Hogan Lovells US LLP

(57) ABSTRACT

An integrated keyboard includes a touch pad and a dynamic keyboard embedded in an area of the touch pad. The touch pad, which may provide a transparent surface to allow the keyboard to be visible, provides motion tracking in areas around the periphery of the keyboard and may be configured into many operating modes. For example, virtual touchable buttons may be configured in the periphery of the keyboard. The keyboard may be provided as a dynamic keyboard with various layouts. A keyboard protector may be provided for each layout, with printed symbols for the keys under the layout. The integrated keyboard may also include a mini-projector to allow projection of a large image on a surface and a virtual Human Interface Device (HID) system to facilitate data input. With the input capabilities of the touch pad and the keyboard, the projector may be controlled in many additional ways not available in conventional projectors that are controlled by a few buttons. The virtual HID may provide motion tracking. The integrated keyboard may interface with a master/slave device, such as a slate type device. A customized case tightly integrates the integrated keyboard with the master/slave device.

82 Claims, 13 Drawing Sheets

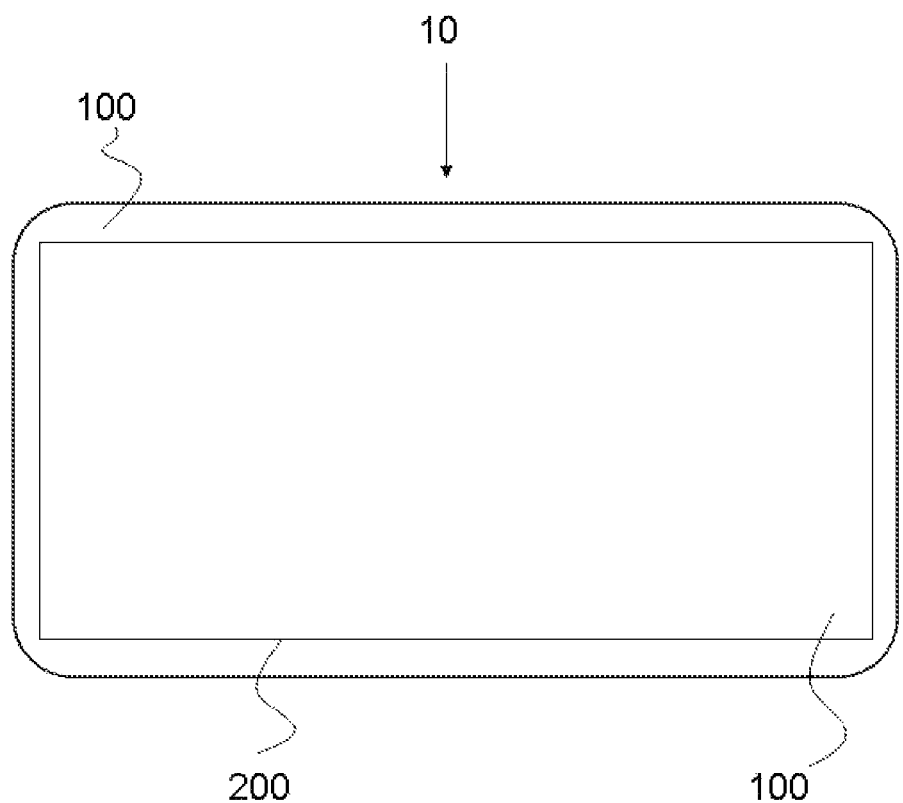

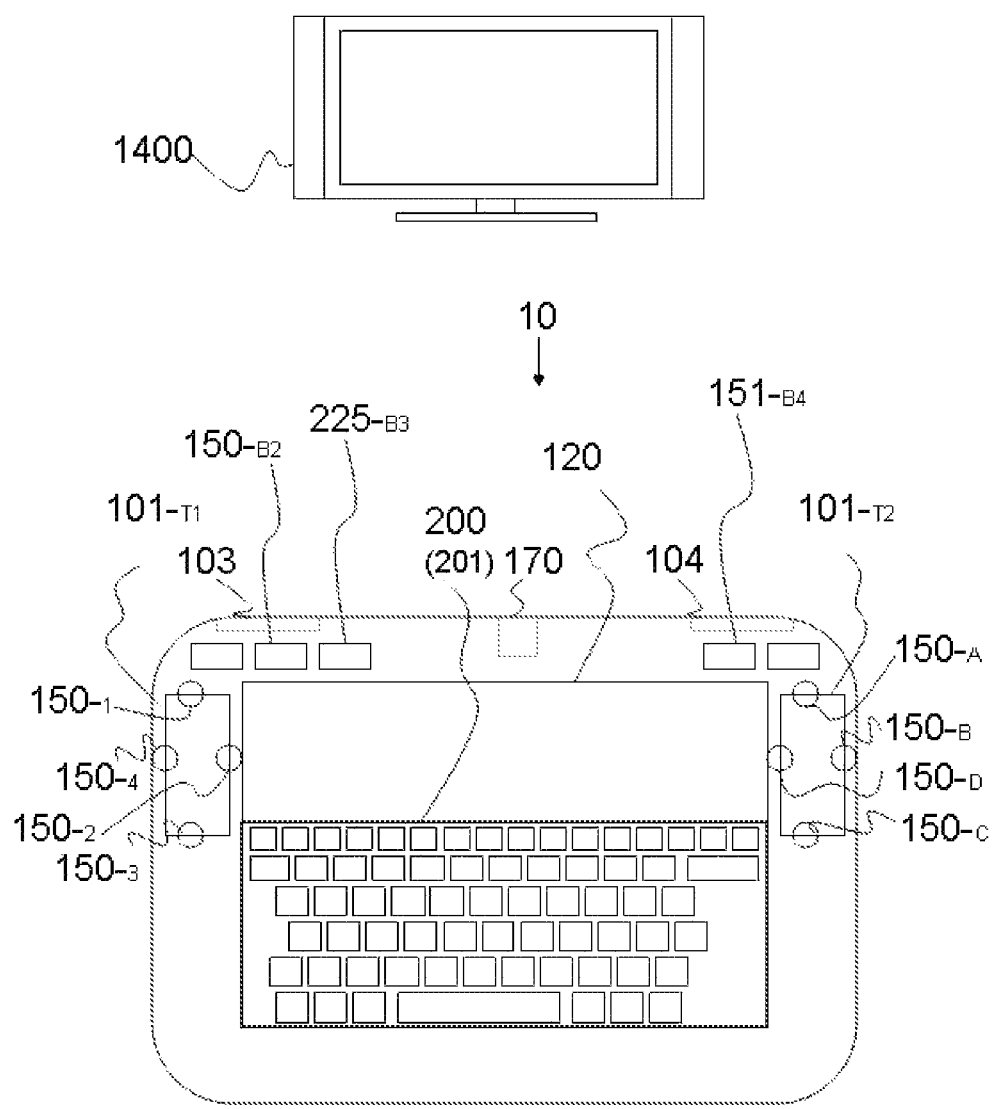

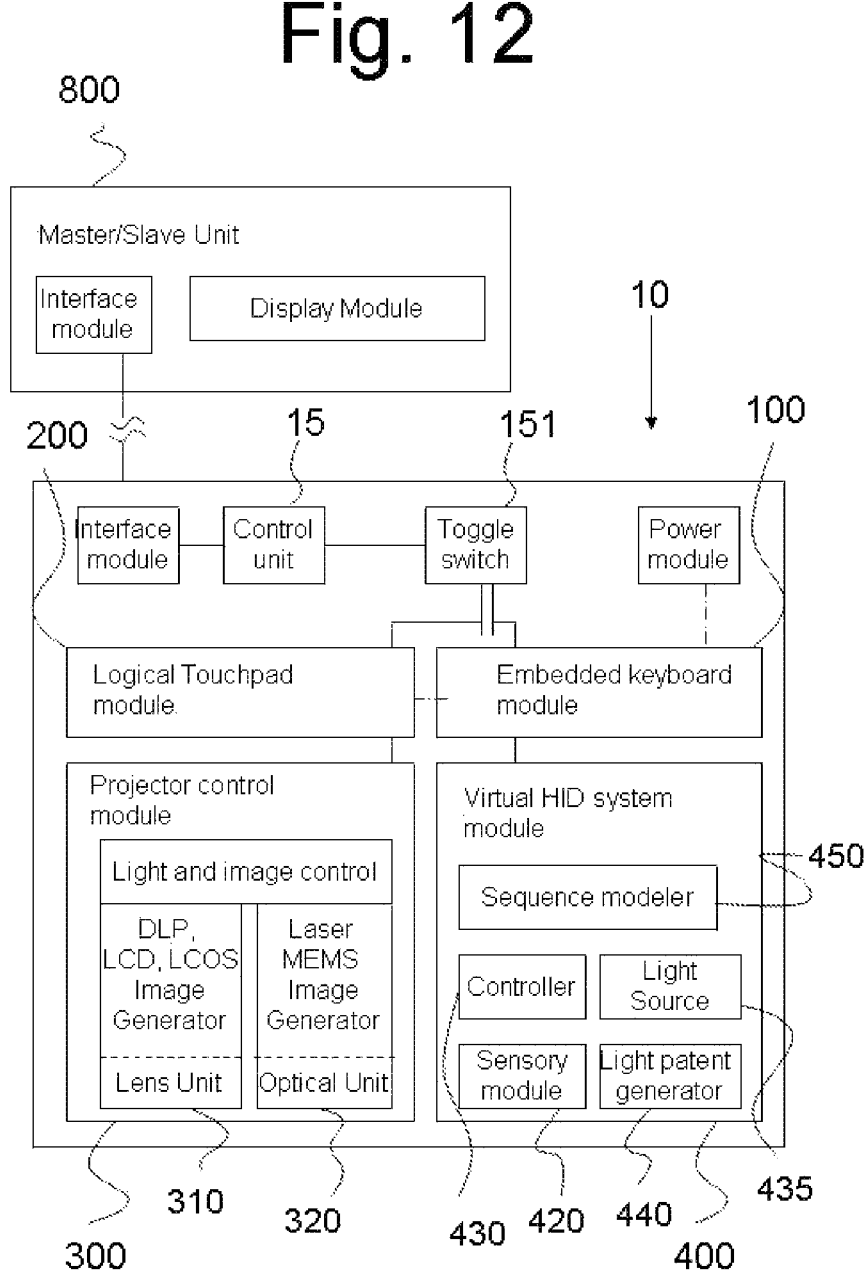

KEYBOARDS AND METHODS THEREOF

CROSS REFERENCE TO RELATED APPLICATIONS

The present application is related to and claims priority of (a) U.S. provisional patent application Ser. No. 61/311,365, entitled "Magic Keyboard," filed on Mar. 7, 2010, and (ii) U.S. provisional patent application Ser. No. 61/311,369, entitled "Smart Keyboard," filed on Mar. 7, 2010. The disclosures of these provisional patent applications are hereby incorporated by reference in their entireties.

BACKGROUND OF THE INVENTION

1. Field of the Invention

The present invention relates to advanced input device technology. More particularly, the present invention relates to keyboards that incorporate one or more touch pad, virtual human interface device (HID), and projector functions.

2. Discussion of the Related Art

Keyboards, touch pads, and mice are human-computer interface devices which were historically separately developed and remain separate devices today. Therefore, in a typical portable computer, although a touch pad is located either at a top portion or at a bottom portion of a physical keyboard, the keyboard and the touch pad are controlled separately and operate independently. Similarly, an external mouse is either connected directly through a USB port, or wirelessly through a wireless controller (e.g., a Bluetooth module). These conventional human-computer interfaces not only have large "footprints," these separately controlled and independently operating components do not fit very well on a device that has serious space limitations (e.g., a cellular phone). Therefore, to minimize the required space for a human-device interface, touch screens or touch displays have been introduced into many portable and mobile devices recently to implement virtual keyboards, and touch-tracking functions. However, during operation, such a solution sacrifices a major portion of the screen or display to display a virtual keyboard. For this reason, a physical mini-keyboard is still often included in many cellular telephones to avoid burdening the display and to allow easier data entry. In these devices, a user would suffer the inconvenience of switching back and forth between manipulating a cursor at the touch screen and entering data using the keyboard.

Many attempts at improvement have been devised, such as displaying a virtual keyboard on a touch screen, and the "magic mouse" that is introduced by Apple Computer. Some touch screens limit the touch-tracking area to the display screen, so that the touch-tracking function is not extended to control buttons, or to control the cursor outside of the display area. The magic mouse provides a 75% touchable area on its surface, so that multi-finger gesture tracking may be implemented over the touch pad on top of the mouse. However, while the magic mouse supports full surface area touch-tracking functions, no keyboard function is provided.

The small form-factor of the input devices makes it difficult for a user to share information with others and to enter data quickly. Such difficulties persist even in a typical slate type device (e.g., an eBook or an iPad), where a larger touch screen is provided. Other improvement attempts include a foldable keyboard and a virtual laser projection keyboard. These devices support larger physical and virtual keyboards for easier data entry, but lack touch and navigation functions. Moreover, such devices typically still require pairing with a separate touch pad to allow finger motion tracking and cursor navigations.

Meanwhile, portable projection display technology advances include laser, Micro-Electro-Mechanical System (MEMS), Liquid Crystal Display (LCD), Liquid Crystal On Silicon (LCOS), and Digital Light Processing (DLP) projectors. Some of these projectors have been provided as stand-alone devices, or are embedded inside mobile devices as pocket projectors. Like conventional external large projectors, these newer stand-alone pocket projectors can provide a larger display, but provide relatively inflexible control functions represented by the few control buttons provided. Full data input and sophisticated touch capabilities have not been provided.

SUMMARY OF THE INVENTION

According to one embodiment of the present invention, a method and a keyboard are provided which embed a keyboard inside a touch pad to provide a 2-in-1 touch-keyboard device ("magic keyboard"), thereby allowing a user to both enter data and control a cursor in the same working area. The magic keyboard integrates both keyboard functions and touch pad functions to provide a continuous and broader touch-tracking area spanning both the embedded keyboard area and the area surrounding the embedded keyboard.

In one embodiment, the magic keyboard may be implemented as a stand-alone device that may directly or indirectly connect wired or wirelessly to or be integrated into a host master/slave device.

In one embodiment, the magic keyboard is programmable to provide a set of user definable buttons and touchable boxes to meet the needs of specific applications.

According to one embodiment of the present invention, the magic keyboard may be used as a generic platform to provide remote control. In one embodiment, the magic keyboard based universal remote control dynamically displays the layouts of various buttons and keyboards, while providing touch-tracking function on, above, and around the button and keyboard layouts.

According to one embodiment of the present invention, the magic keyboard may be used to provide a gaming control platform. Such a gaming control device provides both keyboard and touch-tracking operations within finger reachable range.

According to one embodiment of the present invention, a magic keyboard may replace a physical mini-keyboard on a cellular telephone, a virtual keyboard on a slate device, or a stand-alone keyboard, providing touch tracking functions along the edges of the magic keyboard. In one embodiment, touch-sensitive logical buttons replace mechanical buttons of the prior art.

In accordance with the present invention, a method and apparatus provide an advanced device which embeds a keyboard in a touch pad. In one implementation, touch-tracking functions are provided around and above the keyboard. Such a touch pad not only provides a continuous and broad finger touch-tracking area that is located on, over, and around the keyboard, but is also aesthetically pleasing. The embedded keyboard may include a cost-effective ink-printed layout, a conventional physical keys layout, or a dynamic layout. The embedded layout may be displayed using an LCD display or electronic ink display ("ePaper").

The present invention is particularly suited in electronic devices that require low-cost, dynamic, and small-footprint keyboard and touch-tracking operations within a finger reachable range and without requiring arm movements, or moving fingers back-and-forth among different input components.

According to one embodiment of the present invention, a method and a "smart keyboard" are provided which integrate a virtual human-computer interface, a micro-projector, or both on a magic keyboard. The smart keyboard integrates keyboard, touch pad, virtual HID and large display functions to overcome prior art data entry, touching, and display constraints. The edge touch pad and the virtual human-computer interface allow easy data entry and cursor navigation, while the micro-projector provides a large display to allow information sharing.

In one embodiment, the smart keyboard may be implemented as a stand-alone device that may directly and wirelessly connect to or be integrated into a host master/slave device.

In one embodiment, the smart keyboard is programmable to provide a set of user-definable buttons and touchable boxes to meet the needs of specific applications.

In accordance with the present invention, a smart keyboard integrates a keyboard, a touch pad, a HID, and a projector. In one embodiment, the smart keyboard includes a magic keyboard and either a mini-projector for larger display or a virtual human-computer interface, or both, to provide easy data entry. Unlike a conventional stand-alone LCD or DLP projector that provides limited control using a few buttons, the smart keyboard provides, in addition to a larger display, a full physical or virtual keyboard, data navigation control, and data sharing capabilities, all within a limited space. Therefore, the smart keyboard is especially suited for mobile and slate electronic device types with space considerations. For example, the smart keyboard allows presentations to be made directly from a mobile or a slate device, obviating the need for the bulky external LCD panel and keyboards of the prior art. Furthermore, the smart keyboard has a small footprint and a pleasing external appearance.

The present invention is better understood upon consideration of the detailed description below in conjunction with the accompanying drawings.

BRIEF DESCRIPTION OF THE DRAWINGS

FIG. 1 is a top view of magic keyboard 10, in accordance with one embodiment of the present invention.

FIG. 3a is a top view of magic keyboard 10 with edge touch functions on and around printed keyboard 203 or dynamic keyboard 201, in accordance with one embodiment of the present invention.

FIG. 12 is a block diagram of smart keyboard 10, in accordance with one embodiment of the present invention.

To achieve clarity and brevity, like elements and components in these figures are assigned like reference numerals.

DESCRIPTION OF THE PREFERRED EMBODIMENT

FIG. 1 shows a top view of magic keyboard 10, in one embodiment of the present invention. As shown in FIG. 1, magic keyboard 10 includes touch pad 100 and keyboard 200. Touch pad 100 is a pointing device having a specialized touch-sensitive surface, using a sensing module based on any one or more of the following techniques: resistive-sensing, capacitive-sensing, and surface acoustic wave-sensing. The sensing module detects a user's touch, generate a motion event corresponding to the detected touch, and translate the motion event (i.e., motion data and one or more positions of the touch) to motion data and a relative position, which may be displayed on an engaged display device (e.g., a display screen of master/slave device 1400 shown in FIG. 3a, described in further detail below) to provide visual feedback. Keyboard 200 may be implemented as one of a printed keyboard, a dynamic keyboard, or a physical keyboard.

Figure 2A:
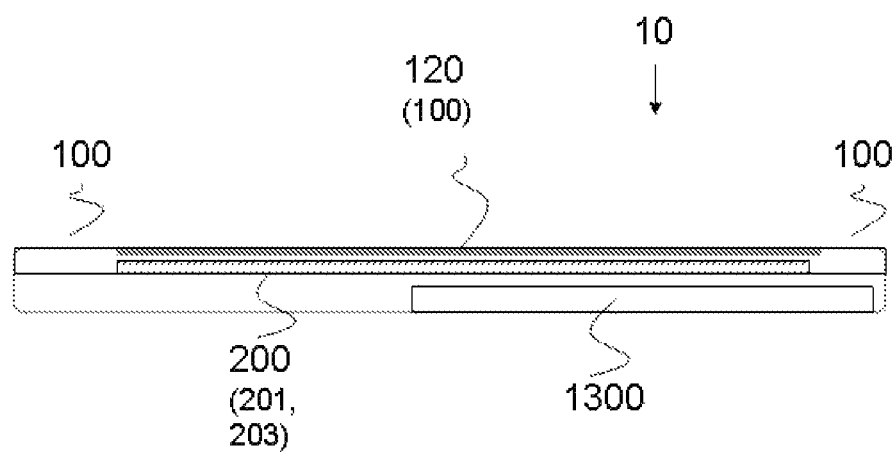
FIG. 2a is a side view of magic keyboard 10 that is implemented with printed keyboard 203 or dynamic keyboard 201 underneath touch pad 100, in accordance with the present invention.

FIG. 2a is a side view of magic keyboard 10 that is implemented as a printed keyboard (designated in this detailed description as printed keyboard 203), or as a virtual or dynamic keyboard (designated dynamic keyboard 201 in this detailed description). The dynamic keyboard may be displayed, for example, by a screen provided underneath a transparent touch pad 100 (e.g., touch pad 100 may be part of a touch screen device). Dynamic and cost-effectiveness considerations may determine whether dynamic keyboard 201 or printed keyboard 203 is to be provided. Dynamic keyboard 201 is a dynamic on-screen keyboard displayed, for example, on a LCD display or an ePaper display. An ePaper or electronic ink display is a display technique that requires only a low refresh rate and which is designed to mimic the appearance of ordinary ink on paper. As the dynamic keyboard layout may be seen through transparent touch pad 100, a user can touch or tap each individual key at a predefined engaging speed to perform data entry. Printed keyboard 203 has a layout that is printed by ink directly on surface of touch pad 100 or on a piece of paper, a plastic sheet, or a metal sheet that is placed beneath surface of touch pad 100. When available, a control device (e.g., master/slave device 1400 of FIG. 3*a*) may echo and display the corresponding symbol of each detected keystroke on a graphical display to provide visual feedback to the user.

As shown in FIG. 2*a*, dynamic keyboard 201 or printed keyboard 203 may be placed underneath transparent touch pad 100, which has a surface area greater than that of either dynamic keyboard 201 or printed keyboard 203. In one embodiment, the area of touch pad 100 over the dynamic keyboard 201 or printed keyboard 203 is "toggle-able" touch pad 120. Toggle-able touch pad 120 can be alternatively toggled to act as the key selection touch screen for keyboard 200, or as a part of larger touch pad 100 to make the entire surface of touch pad 100, if desired, a continuous touchable area for touch operations.

Figure 2B:
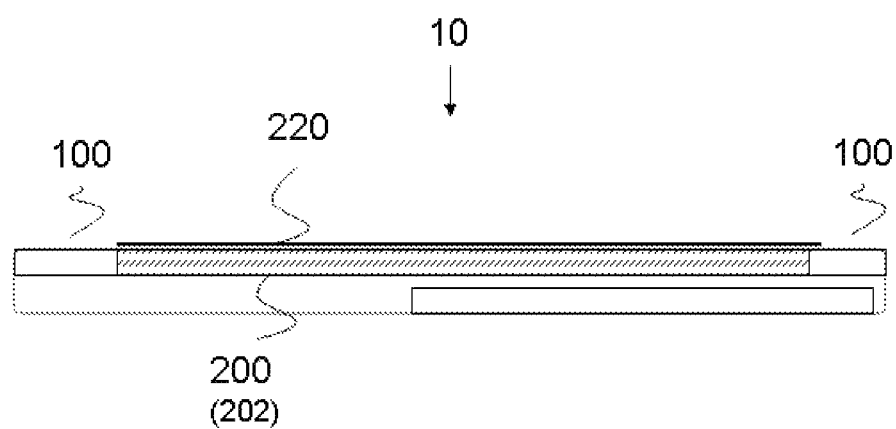
FIG. 2b is a side view of magic keyboard 10 with physical keyboard 202, in accordance with one embodiment of the present invention.

FIG. 2*b* is a side view of magic keyboard 10 with physical keyboard 202, in accordance with one embodiment of the present invention. Physical keyboard 202 has mechanical keys 205 made of plastic, membrane, or another suitable material. In one embodiment, for backward compatibility and convenience considerations, physical keyboard 202 can be embedded inside or surrounded by touch pad 100. Such an arrangement is particularly suitable for providing edge touch tracking around a mini-keyboard provided on a cellular telephone. A user may enter data through physical keyboard 201, while navigate using touch along the edges of touch pad 100 (e.g., using up-down and left-right finger motions) without moving a finger back-and-forth between the keyboard and a separate touch pad (e.g., a touch display screen controlled by a master/slave device 1400 of FIG. 3*a*, for example). In FIG. 2*b*, optional keyboard protector 220 is provided on top of physical keyboard 200.

FIG. 3*a* is a top view of magic keyboard 10 with edge touch functions on and around printed keyboard 203 or dynamic keyboard 201, in accordance with one embodiment of the present invention. As discussed with respect to FIG. 2*a*, dynamic keyboard 201 or printed keyboard 203 may be covered by transparent touch pad 100, which has a surface that is greater in area than either of the keyboards. As shown in FIG. 3*a*, around keyboard 200, the touchable surface of touch pad 100 may be further allocated to implement logical buttons 150 and touchable boxes 101. Each of logical buttons 150 is relatively smaller than touchable box 101. An ink-printed symbol 225 (e.g., the "B3" label in FIG. 3*a*) may be provided on touch pad 100 for corresponding logical buttons 150. Touchable logical buttons 150 and touchable boxes 101 are each programmable to allow a user to dynamically redefine an action value to be returned to an application program when a key on keyboard 200 is touched. For example, logical button 151 may be programmed to be an on/off button which returns '1' or '0', depending on its maintained state. Alternatively, logical button 151 may be redefined to return 'A' or 'B'. Together with physical left button 103 and right button 104 on a front edge of the magic keyboard 10, such flexibility is particularly useful in gaming applications, in which programmers often provide a set of user definable buttons 150 and touchable-box 101 to meet particular run-time requirements and to perform special functions. For example, the touchable boxes labeled "T1" and "T2" may be defined to be small touch pads. A user can also indirectly control cursor movements on display of a master/slave device 1400 or even control cursor movements on dynamic keyboard 201 with dynamically defined up-down and left-right keys (e.g., moving from position "1", to position "3", and from position "4", to position "2" on T1 touchable boxes 101).

In another one embodiment with optional infrared signal or radio signal generator 170, magic keyboard 10 may be used as a generic platform to provide remote control. Magic keyboard 10 based universal remote control can dynamically display the layouts of various buttons and keyboards, while providing data entry, and touch-tracking function on, above, and around the keyboard for various devices, such as Internet TVs.

Figure 3B:
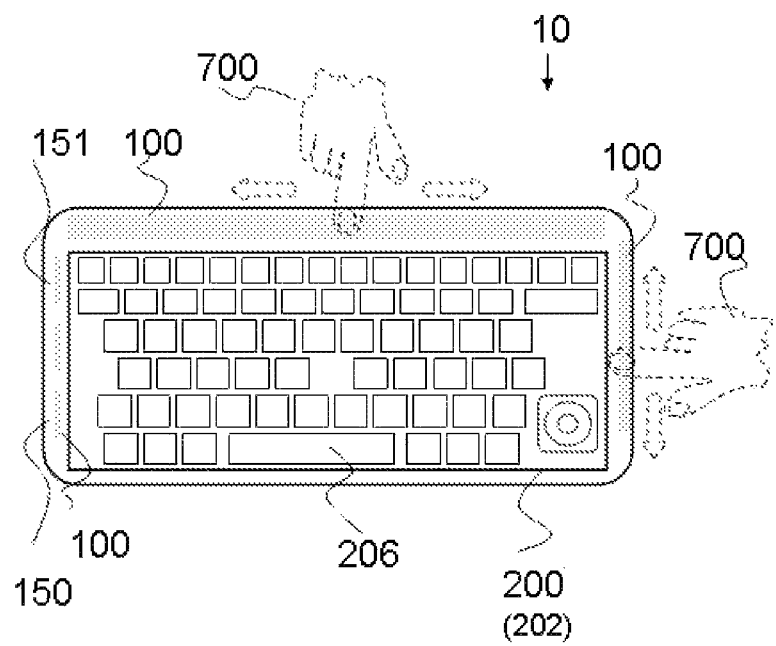
FIG. 3b is a top view of magic keyboard 10 with edge touch functions around physical keyboard 202, in accordance with one embodiment of the present invention.

FIG. 3*b* is a top view of magic keyboard 10 with edge touch functions around physical keyboard 202, in accordance with one embodiment of the present invention. Magic keyboard 10 of FIG. 3*a* is particularly suited in a device which is providing extensive keyboard and touch operations, but limited footprint or space. As shown in FIG. 3*b*, a user can simply touch pad 100 along an edge of keyboard 202 to achieve corresponding up-down and left-right touch operations. Other functions, such as those described above with respect to FIG. 3*a*, may also be implemented. In addition, additional touch operations may be defined on the surface of space key 206. For example, a user may click or push-down on the top end of the space key 206 to indicate entering a "space" keyboard character, on the left-bottom end to indicate clicking a left mouse button, and on the right-bottom end to indicate clicking a right mouse button.

Figure 3C:
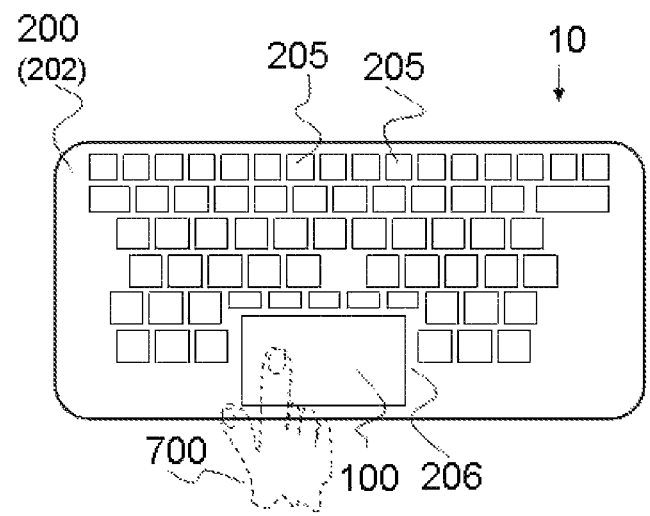
FIG. 3c is a top view of magic keyboard 10 with touch function on space key 206, in accordance with one embodiment of the present invention.

FIG. 3*c* is a top view of magic keyboard 10 with touch function on space key 206, in accordance with one embodiment of the present invention. Unlike physical keyboard 202 of FIG. 3*b*, which resides substantially above touch pad 100, magic keyboard 10 of FIG. 3*c* provides touch pad function on space key 206 on dynamic keyboard 201 or printed keyboard 203. The touch operations of touch pad 100 and space key 206 reduce the space requirement and simplify key-in and touch operations. During operation, a user simply moves his or her thumbs over the surface of space key 206 to perform touch operations, while keying-in data on physical keyboard 202 at the same time. This arrangement is particularly suitable for a device with limited space, but which requires significant amounts of keyboard and touch operations.

Figure 4:
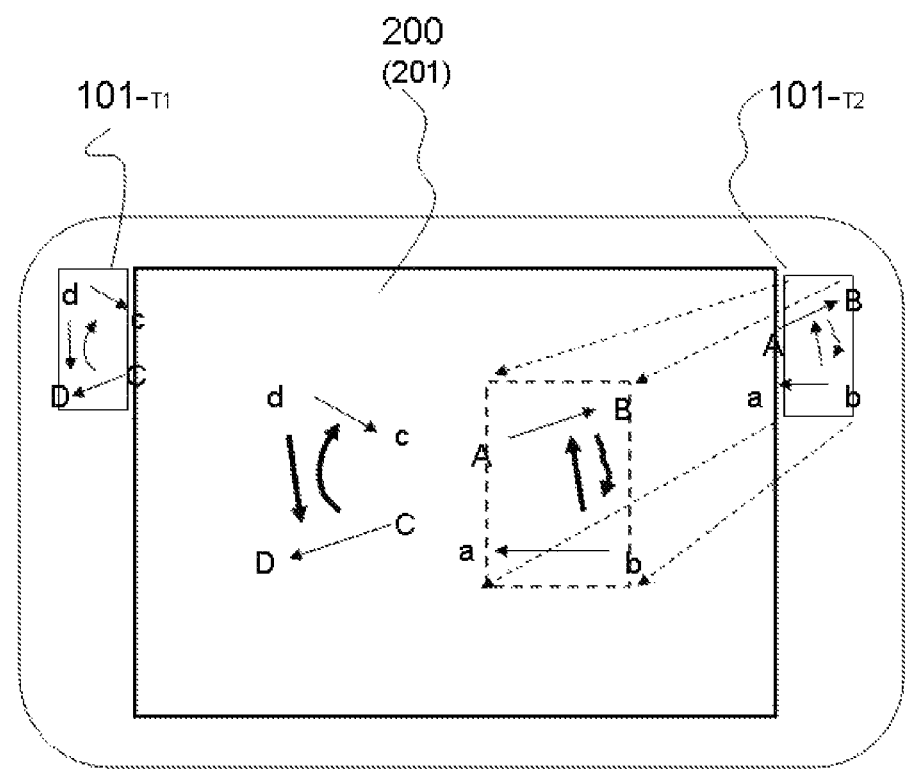
FIG. 4 illustrates multi-touching operations on magic keyboard 10 using edge touch pad 100, in accordance with one embodiment of the present invention.

FIG. 4 illustrates multi-touching operations on magic keyboard's 10 (as configured in the manner shown in FIG. 3*a*) using edge touch pad 100, in accordance with one embodiment of the present invention. As shown in FIG. 4, touch pad 100 includes multiple touchable boxes 101 on its edges (e.g., the touchable boxes labeled, "T1" and "T2"). To achieve a multi-touching motion or to navigate a cursor on a display controlled by a master/slave device 1400, or on the display associated with dynamic keyboard 201, a user may touch touchable boxes 101 boxes individually, simultaneously, or both. For example, a user may place one finger on touchable box 101 (e.g., "T1") and another finger on touchable box 101 (e.g., "T2"). This action is interpreted according to motions defined for touching the two areas on the display to which the touchable boxes 101 are mapped. In FIG. 4, the areas corresponding to these touch boxes are indicated by "mapped T1 Operations" and "mapped T2 operations," respectively.

To indicate a "zoom-out" operation, a user moves one finger on "T1" from position "d" to position "c", while simultaneously moving another finger on "T2" 101 from position "b" to position "a." Similarly, to indicate a "zoom-in" operation, a user moves one finger on "T1" from position "C" to position "D", while simultaneously moving another finger on "T2" from position "A" to position "B." To indicate a "rotate-right" operation, a user moves one finger on "T1" 101 from position "D" to position "d", while simultaneously moving another finger on "T2" from position "B" to position "b." Similarly, to indicate "rotate-left" operation, a user moves one finger on "T1" from position "d" to position "D", while simultaneously moving another finger on "T2" from position "b" to position "B." A control module (e.g., control unit 1300 if FIG. 6) translate the movements on touchable boxes 101 into the indicated actions and shows the results of the operations on a display.

Touchable boxes 101 may also be used for single-touch operations. For example, a user may move a finger inside "T1" in the up, down, left, and right directions to indicate the respective pre-defined "page-up", "page-down", "page-left", and "page-right" operations. A prescribed finger motion is translated into the corresponding pre-defined action and results in scrolling a currently displayed content a page up, down, left or right, as the case may be. Further, in one embodiment, touchable buttons 150 and touchable boxes 101 may be dynamically redefined by an application program to represent different sets of prescribed actions as needed.

Figure 5:
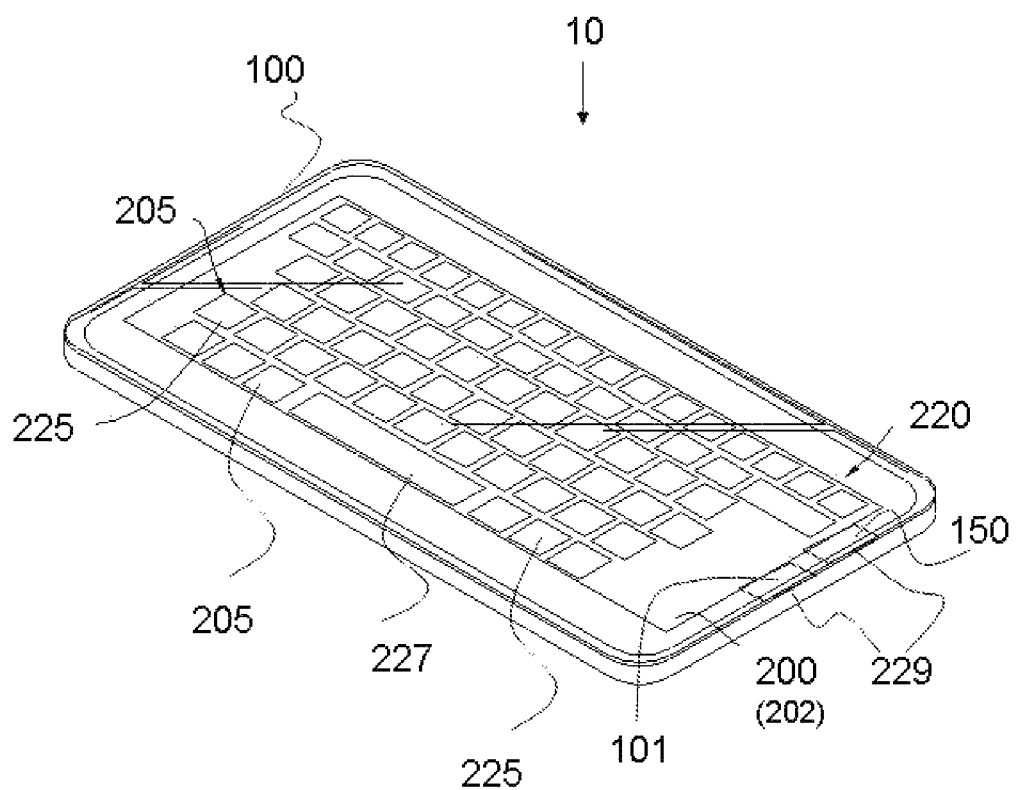
FIG. 5 is a top view of keyboard 200 having provided thereon keyboard protector 220 on which is provided printed symbols 225 and open ports 229, in accordance with one embodiment of the present invention.

FIG. 5 is a top view of keyboard 200 having provided thereon keyboard protector 220. Printed symbols 225 and open ports 229 are provided on keyboard protector 220, in accordance with one embodiment of the present invention. Keyboard protector 220 may be a sheet made out of non-conductive transparent plastic, polyurethane silicone or glass, to be placed over a physical keyboard (e.g., physical keyboard 202) to dynamically overlay different symbols 225 over physical keys 205 and to display an advertisement or message 227 over a physical key. In this manner, keyboard protector 220 may be used to support a keyboard for a foreign language, obviating replacing physical keys 205 for each language. As shown in FIG. 5, keyboard protector 220 is printed with traditional Chinese phonetic symbols 225, overlaying corresponding keys of physical keyboard 202. The labels on some of physical keys 205 (e.g., "N" and "M") may be seen through a transparent part of keyboard protector 220. Open ports 229 are holes allocated on keyboard protector 220 to allow a user's finger to access the "open" portions of edge touch pad 100. Open ports 229 allow such open portions of touch pad 100 to access dynamically configured logical buttons 150 and touchable boxes 101 defined on touch pad 100, in the manner described above with respect to FIG. 3a, for example.

Figure 6:
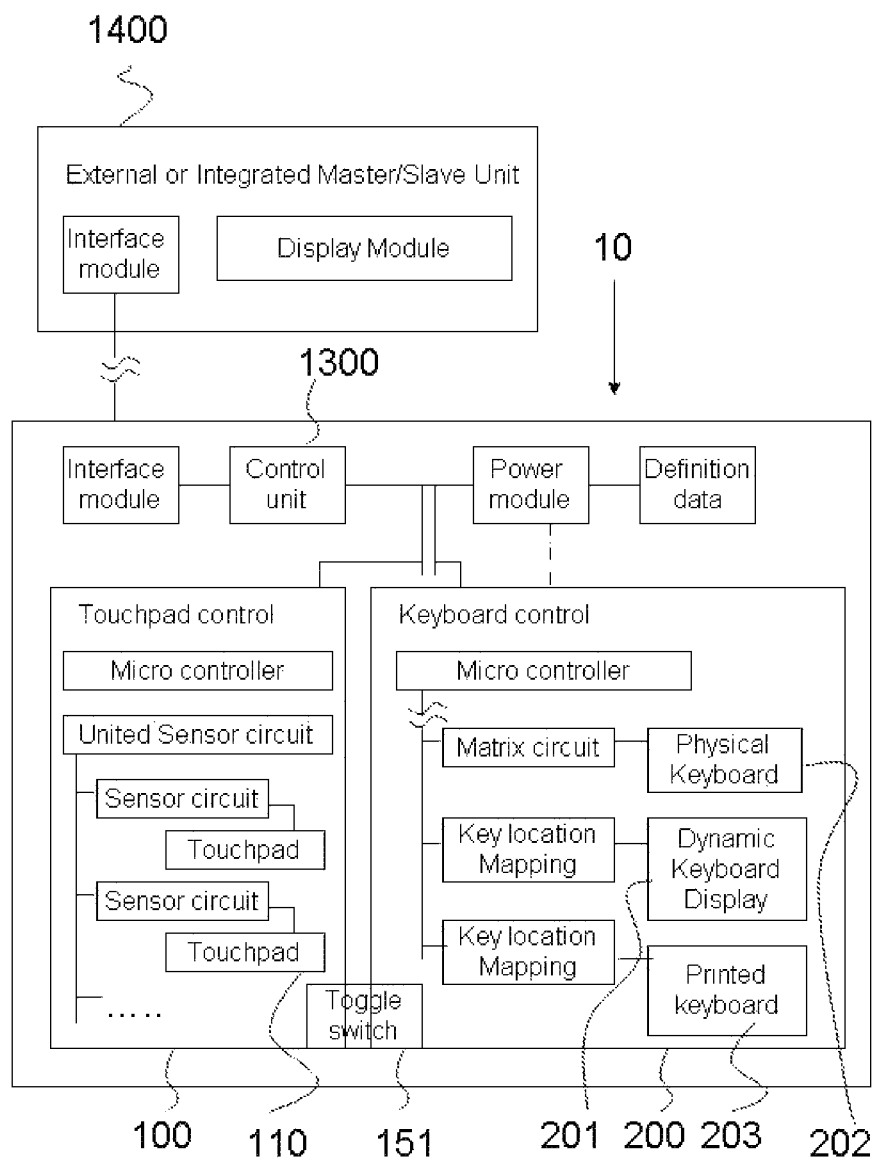
FIG. 6 is an exemplary block diagram of magic keyboard 10, according to one embodiment of the present invention.

FIG. 6 is an exemplary block diagram of magic keyboard 10, according to one embodiment of the present invention. As shown in FIG. 6, magic keyboard 10 includes two functional modules: keyboard 200 and logical touch pad 100, which are electrically controlled by control unit 1300. In this embodiment, keyboard 200 may be implemented by dynamic keyboard 201, physical keyboard 202, or printed keyboard 203. Depending on the type keyboard implemented, conventional keyboard mechanisms, such as a matrix circuit or a key location mapping technique, may be used to operate keyboard 200. Logical touch pad 100 may include one or more physical touch pad 110s. Each physical touch pad 110 is provided a sensor circuit for tracing touch objects and their corresponding actions. The micro-controllers in keyboard 200 and touch pad 100 work together to send location information, key commands, or object actions to control unit 1300. Control unit 1300 controls these internal modules, and directly or remotely communicates with an integrated or external master/slave device 1400 through an interface module. Typically, control unit 1300 returns key data or object actions to an application program running on master/slave device 1400. Control unit 1300 can load data definitions from the application program for translating key data or object actions into values prescribed by the application program. These key data or object actions may be mapped into and showed on a display device controlled by master/slave device 1400, or on the touch screen associated with a dynamic keyboard. In addition, a user can push toggle switch 151, which is defined to allow the user to selectively enabling or disabling various parts of touch pad 100.

Figure 7:
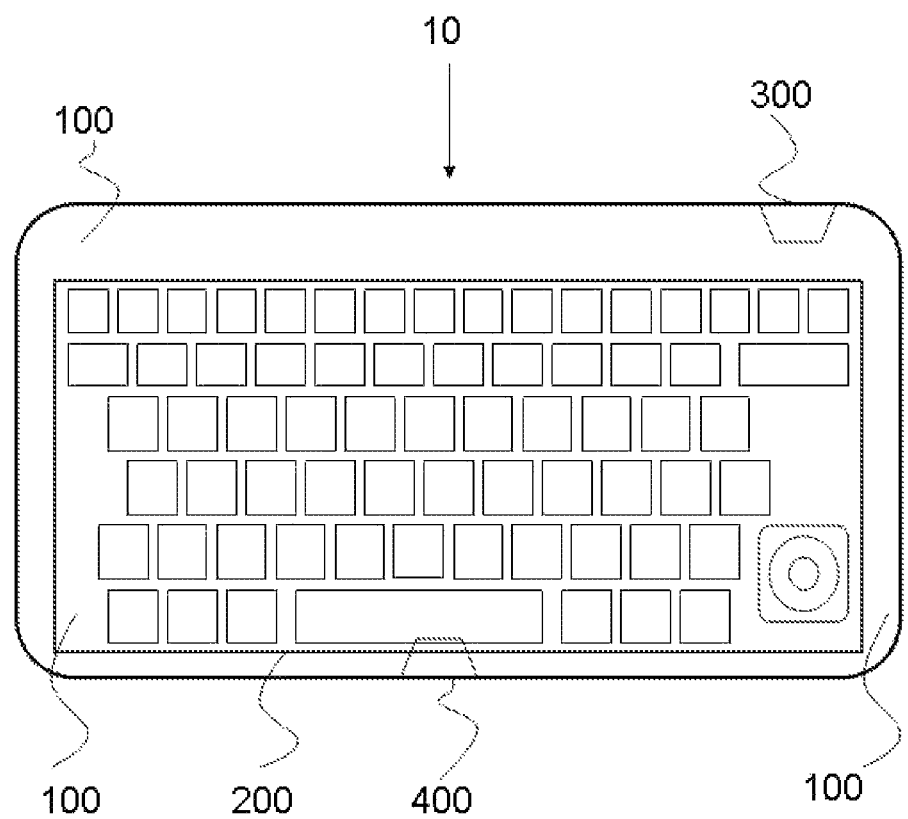
FIG. 7 is a top view of a smart keyboard 10, in accordance with one embodiment of the present invention.

FIG. 7 is a top view of a smart keyboard 10, in accordance with one embodiment of the present invention. Smart keyboard 10 includes keyboard 200, touch pad 100, projector 300, and virtual HID system 400. Keyboard 200 and center and edge touch pad 100 forms a magic keyboard, as described above. Projector 300 displays video, images or computer data on a screen or another surface. Projector 300 may be implemented using MEMS scanning mirror, DLP, LCOS and LCD techniques. Virtual HID system 400 includes application programs that can configure smart keyboard 100 into one or more of a keyboard, a mice, a trackballs, a touch pads, a pointing sticks, a graphics tablet, a joystick, or a gamepad.

In this embodiment, touch pad 100 provides a continuous touch surface over and around keyboard 200. Virtual HID system 400 and touch pad 100 together provide convenient data input and cursor control capabilities, which are particularly desirable for use with a slate type electronic device that typically lacks built-in HID components. Unlike a stand-alone projector, which typically includes only a few control buttons for implementing a small number of control functions and no data entry capability, projector 300 and keyboard 200 together provide a large display capability, without requiring a built-in display panel, and full keyboard data entry functions.

Figure 8:
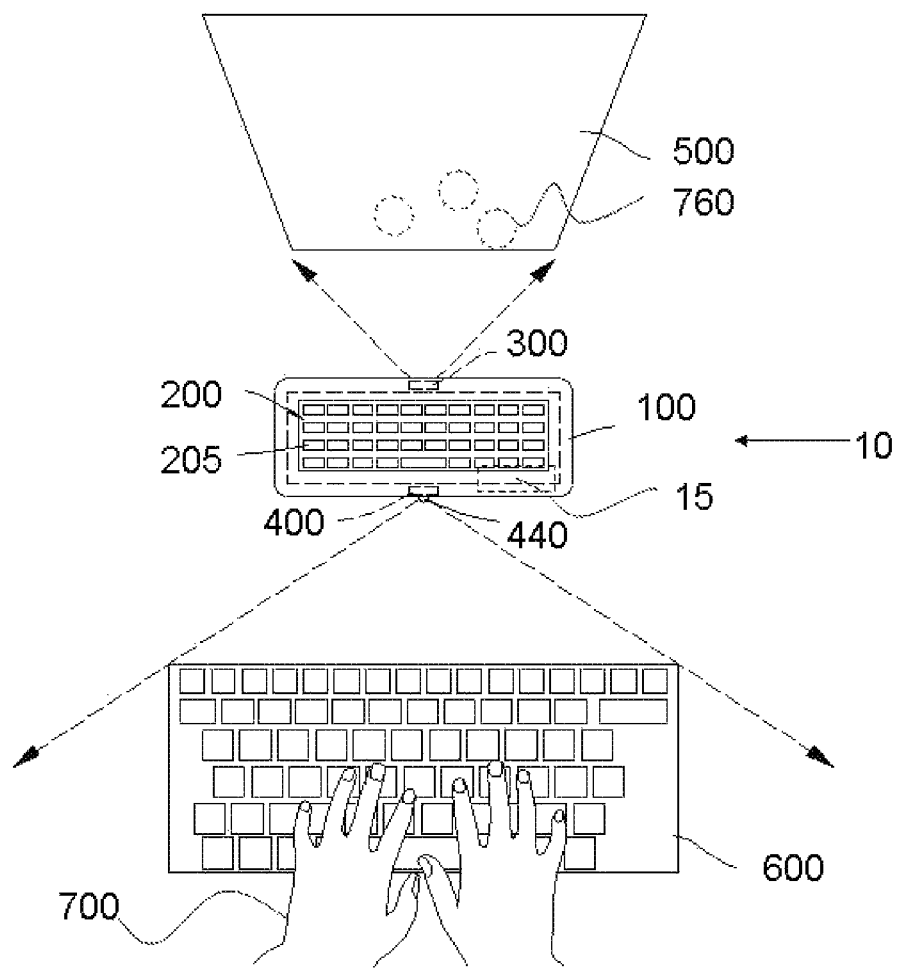
FIG. 8 is a top view of smart keyboard 10 with keyboard 200 embedded inside touch pad 100, projector 300 and virtual HID keyboard 600, in accordance with one embodiment of the present invention.

FIG. 8 is a top view of smart keyboard 10 with keyboard 200 embedded inside touch pad 100, projector 300 and virtual HID keyboard 600, in accordance with one embodiment of the present invention. As shown in FIG. 8, smart keyboard 10 includes keyboard 200 (e.g., physical keyboard 202) that allows simple and quick data entry, touch pad 100 that surrounds keyboard 200 to allow easy cursor control, projector 300 that projects forward to provide an image 500, and virtual HID system 400 that projects virtual HID keyboard 600 capable of full keyboard operations. Image 500 may be projected to feedback module 760, which may provide feedback signals to smart keyboard 10 (see discussion below with respect to FIG. 10a).

Virtual HID system 400 detects motion (e.g., movement of a user's fingers) and sends information of the detected motion to integrated controller 15. Integrated controller 15 forwards the information to master/slave device 1400 (not shown), which is then provided to a running application for interpretation of the detected motion. Projector 300 incorporates a commercially available compact display engine (e.g., Microvision PicoP® Display Engine (PDE)). Controller 15 electronically connects to the PDE to provide electronic signals representing the image data. The electronic signals specify different colors and intensities for projector 300's laser light sources, which provide the specified optical signals down from their respective light paths, which are then combined at a combiner optical element into a single path. The combined optical signals in the single path are projected on to a micro-mirror, which reproduces the image pixel-by-pixel onto a target surface.

Figure 9:
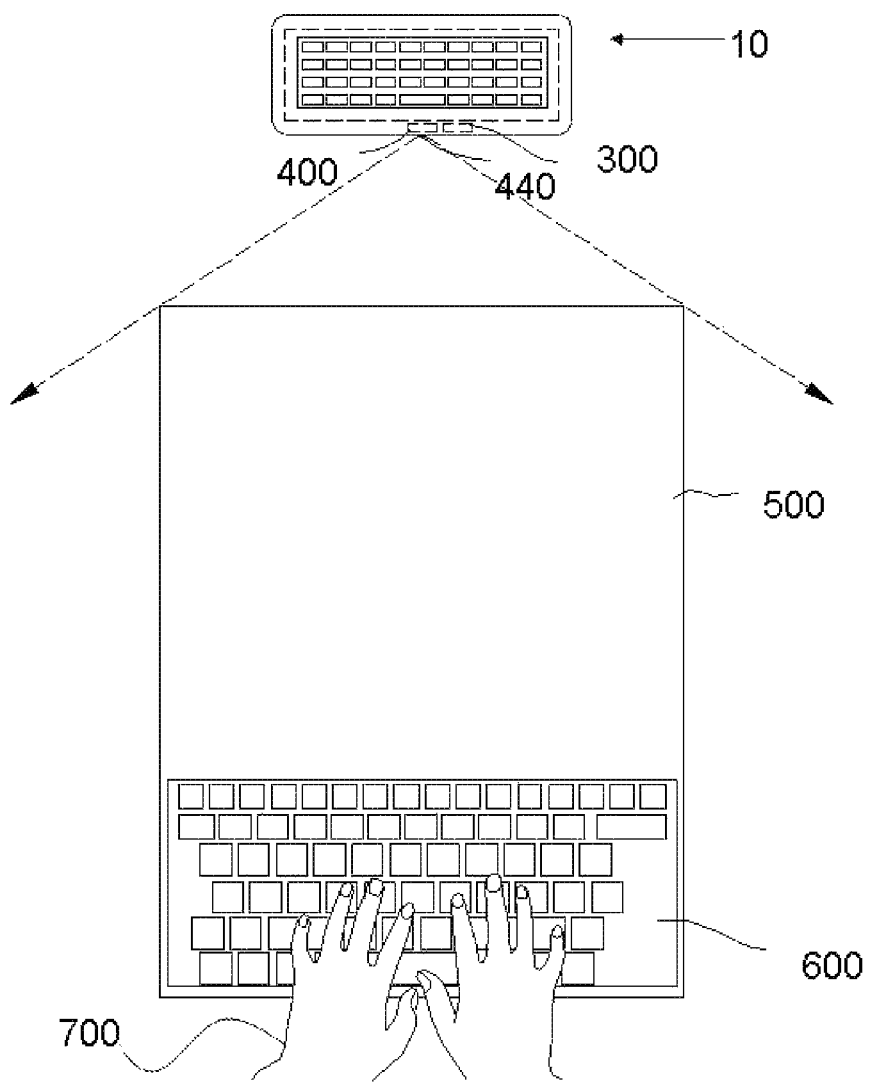
FIG. 9 is a top view of smart keyboard 10 with integrated mini-projector 300 and virtual HID 400, according to one embodiment of the present invention.

FIG. 9 is a top view of smart keyboard 10 with integrated mini-projector 300 and virtual HID 400, according to one embodiment of the present invention. As shown in FIG. 9, smart keyboard 10 includes (a) keyboard 200 (e.g., physical keyboard 202), which is intended for simple and quick data entry; (b) touch pad 100, which surrounds keyboard 200 to allow easy cursor control; (c) projector 300 and (d) virtual HID system 400. In this embodiment, projector 300 faces the user to project image 500, which includes larger virtual HID keyboard 200. Motion representing typing on virtual HID keyboard 200 is detected by virtual HID system 400. Under the configuration of FIG. 9, a user views image 500 and enters data using the same surface.

Figure 10A:
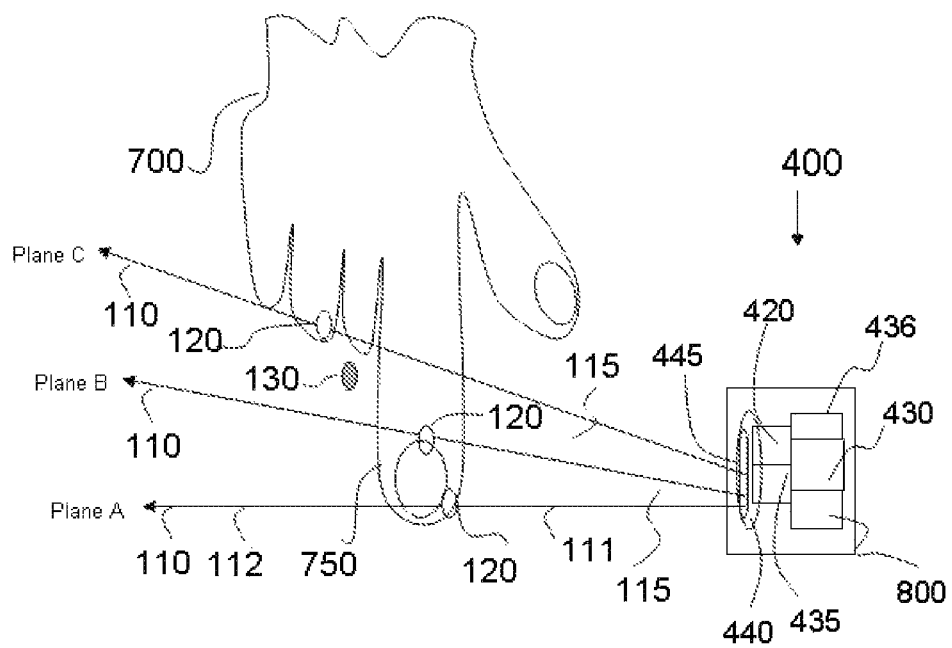
FIG. 10a is a side view of HID module 400, according to one embodiment of the present invention.

FIG. 10a is a side view of HID module 400, according to one embodiment of the present invention. HID system 400 includes light source 435, light pattern generator 440, sensory module 420, and controller 430. In addition, HID module 400 may include feedback module 760. Light source 350 provides light for projection, typically of wavelengths between 750 and 1000 nanometer (or light in the infrared range).

Light pattern generator 440 produces various patterned light on planes 110, each projected plane being separated from an immediately neighboring projected plane by a pre-defined fixed angle 115. The planes are typically pre-defined by a commercially available light pattern lens (e.g., light pattern lens 445). In addition to the light pattern from the light pattern lens, light patterns and predefined images can be dynamically generated by a raster scanning light beam controlled by a MEMS scanning mirror (e.g., Microvision's MEMS scanning minor). Each light plane in light planes 110 is a sheet of light delivered onto a target, so as to provide at least one reflected light point at the intersection between the light plane and the target. From these reflected light points that result from light planes 110, 3-dimensional (3-D) data may be derived by sensor module 420. For example, base light plane 112 corresponds to a horizontal light plane, designated by a value '0' (i.e., 0 degrees to the horizontal axis). Trigger light plane 111 activates an application event in an application program when a target engages (i.e., intersects) this pre-selected plane. Sensory module 420, which may be implemented by a commercial 3-D sensor/scanner (e.g., a Canesta 3D scanner), detects the reflected light point 120 on the target and returns the coordinates of the reflected light point, The coordinates may be specified in Cartesian coordinates (i.e., along, for example, the x-axis, the y-axis, and the z-axis). HID controller 430 controls the flow of data and coordinates detection activities. The detection activities include (a) invoking light pattern generator 440 to project multiple light planes 110 simultaneously, (b) receiving from sensory module 420 positional data of reflected light points 120, (c) acquiring distance and location for each reflected light point (i.e., the 3-D data), (d) sending the 3-D data to and interacts with an application running on an internal host of smart keyboard 10 or on an external host device 1400.

In one embodiment, angle 115 may be any angle within the range between 1° to 120°. A legitimate target (e.g., target 750) has a solid body or bodies located such as to intersect at least two adjacent light planes 110, as shown in FIG. 10a. A frivolous target is a target that is either non-solid across or outside the service spaces of light planes 110. Reflected light points that are detected outside the service spaces of light planes 110 are deemed noise (e.g., reflected light point 130). The tracking field is the motion tracking space defined by base light plane 112 and at least one other active light plane in light planes 110. Unlike conventional 3-D tracking systems, HID module 400 uses a commercially available light pattern lens (e.g., light pattern lens 445) to generate simple and few light planes 110 to generate a small number of reflected light points 120 at target 750, which are detected by 3-D sensor module 420. The 3-D positions of these few reflected light points 120 are quickly determined without requiring multiple light sources and sensors. Depending on which HID application program is running, HID controller 430 simply compares positions derived from snapshots of light points 120 against the application program's pre-trained gesture data in a database. Based on the comparisons, the application program interprets the target's indicated action (e.g., whether or not the user has entered a character or has performed a cursor navigation operation). HID module 400 therefore requires neither sophisticated algorithms nor heavy computation.

Figure 10B:
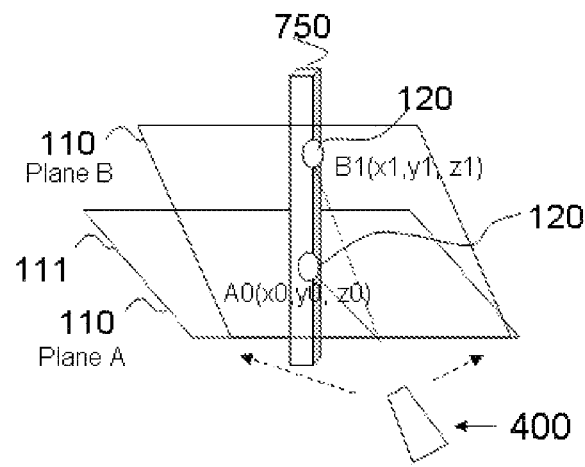
FIG. 10b is a front view showing two reflected light points 120 from a legitimate target 750 scanned by sensory module 420 in X-, Y-, and Z-axis 3-D data positions, according to one embodiment of the present invention.

FIG. 10b is a front view showing two reflected light points 120 from a legitimate target 750 scanned by sensory module 420 in X-, Y-, and Z-axis 3-D data positions, according to one embodiment of the present invention. FIG. 10b shows reflected light point A0(x0, y0, z0), reflected from light plane A, and reflected light point B1(x1, y1, z1), reflected from light plane B. In this embodiment, target 750 may be a user's finger. Sensory module 420 may be implemented by a commercially available 3-D CMOS camera sensor module that detects light in the infrared range. Such a sensor module may track multiple moving targets in a quick and responsive way. Although only two reflected light points are shown in FIG. 10b, the number of reflected light points increase with the number of light planes projected (i.e., smaller projection separation angle 115 out of light pattern lens 445). A larger number of reflected light points provide more detail information, thereby increases accuracy of motion tracking.

Figure 11:
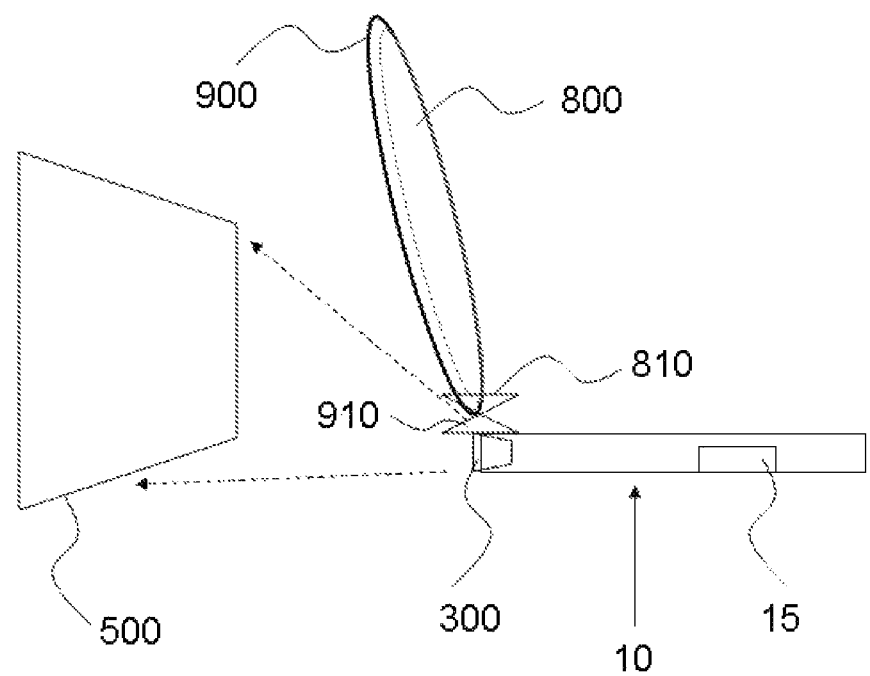
FIG. 11 is a side view of smart keyboard 10 tightly integrated with master/slave device 800, in accordance with one embodiment of the present invention.

FIG. 11 is a side view of smart keyboard 10 tightly integrated with portable master/slave device 800, in accordance with one embodiment of the present invention. Master/slave device 800 may be, for example, a slate device or a portable computer, a cellular telephone, a MP3 player or an "IPod" type media player. As shown in FIG. 11, device holder 900 connects electrically and provides mechanical support for smart keyboard 10 and master/slave device 800. Device holder 900 may be implemented using a plastic, leather, or metal case which allows master/slave device 800 to snap into. Device holder 900 may be opened and closed like a folder or clam shell, with one end being able to rotate freely through 180 degrees, such that device holder 900 may close with a display unit of master/slave device 800 facing outside. Device connector 810 and system connector 910 connect to master/slave device 800 and smart keyboard 10, respectively, so that master/slave device 800 and smart keyboard 10 may be tightly integrated. System connector 910 couples to controller 15 of smart keyboard 10.

FIG. 12 is a block diagram of smart keyboard 10, in accordance with one embodiment of the present invention. As shown in FIG. 12, smart keyboard 10 includes four functional modules: (a) projector 300, (b) keyboard 200, (c) logical touch pad 100, and (d) virtual HID system 400, all of which are electrically connected to integrated control unit 15 and can be turned on and off by toggle switch 151.

Keyboard 200 is either a dynamic keyboard, or a fixed layout physical keyboard. When a dynamic keyboard is used, then a key location mapping unit works in conjunction with control unit 15 to determine which key is being pressed or the relative location of the logical key that is being touched by a user. Alternatively, when a physical keyboard is used, a matrix circuit determines which physical key is being pressed by the user. A micro-controller in keyboard 200 sends a corresponding action or sequence number to control unit 15, when pressing of a key is detected.

Projector 300 includes a light and image control module, an image generator or source module, and an optical or lens module. As shown in FIG. 12, two types of projectors may be used to implement projector 300. For example, projector 310 has an image source implemented using one of MEMS, OLED, LCD, and DLP techniques. The image from the image source is projected through optical elements (e.g., lens). Alternatively, laser projector 320 uses laser light sources of different colors and intensities. The light from each laser light source is guided down different paths to a combiner optical element to provide a single beam that is reflected and directed by a micro MEMS mirror. The mirror projects the image pixel-by-pixel onto a target surface. The light and image control module manages the on-and-off operations in different color light source, and synchronizes them under an appropriate image refresh rate to produce proper images.

Logical touch pad 100 may include any number of physical touch pads. Each physical touch pad includes a sensor circuit for tracing a single-acting touch object at a time. For single motion tracking, logical touch pad 100 includes a single physical touch pad. Alternatively, for multi-motion tracking, logical touch pad 100 may contain one or more physical touch pads which are organized to interface with a united sensor circuit. In that application, the physical touch pads are collectively treated as a single logical sensor circuit. A micro-control circuit sends location information of each touch to control unit 15 and embedded keyboard 200.

Virtual HID system 400 includes (a) controller 420, (b) light source 435, (c) light pattern generator 440, (d) sensory module 420, and (e) sequence modeler 450. Light pattern generator 440 may generates a number of visible or invisible (i.e., outside the sensitivity range of a human eye) light planes that are each separated from a neighboring light plane by a predefined angle. The generated light planes are directed onto one or more targets. Sensory module 420 acquires the 3-D data from the detected light points reflected from one or more targets. Controller 420 invokes sequence modeler 450 to compare incoming snapshots of detected reflected light point positions with pre-trained data in a database to interpret the action or actions indicated by the detected reflected light points. For a fast motion tracking process, control unit 15 and sequence modeler 450 use the light planes to detect reflected light points from pre-determined portions of the targets, without requiring full image scanning. Such operations allow the system to capture and determine a small number of 3-D data points quickly, thereby achieving a simple, portable, and cost effective 3-D motion tracking system.

Control unit 15 controls the internal component modules of smart keyboard 10. Furthermore, through an interface module, control unit 15 may directly or remotely connect and communicate with an internal or external master/slave device 800. Control unit 15 projects images using projector module 300, and sends key sequence and touch location information to master/slave device 800. Depending on the needs of the controlling application program, control unit 15 may drive a slave device or be driven by a master device. For example, control unit 15 may send a key sequence to a slave device to request the slave device to display the key on a display module. Alternatively, an external master device may requests control unit 15 to get input data (e.g., a key sequence or location information).

The detailed description above is provided to illustrate specific embodiments of the present invention and is not intended to be limiting. Many modifications and variations within the scope of the present invention are possible. The present invention is set forth below in the accompanying claims.

We claim:

1. A integrated keyboard, comprising:
a touch pad;
a keyboard that is smaller than the touch pad and occupying an area completely overlapping the touch pad; and
a control unit that controls operations of the keyboard and the touch pad, wherein the control unit configures the touch pad into one or more logical touch pads, each logical touch pad occupying an area of the touch pad that is outside the area occupied by the keyboard.

2. The integrated keyboard of claim 1, wherein the control unit (a) through the logical touch pads, detects a user's touch, (b) generates a motion event based on detection of the user's touch, and (b) translates the detected user's touch into motion data and one or more relative positions.

3. The integrated keyboard of claim 2, further comprising an interface to an external master/slave device wherein the control unit sends to the master/slave device the motion data and the relative positions over the interface.

4. The integrated keyboard of claim 3, wherein the interface comprises a wireless interface.

5. The integrated keyboard of claim 4, wherein the control unit configures the integrated keyboard to function as a remote control unit for the external master/slave device, and wherein the wireless interface uses an infrared, WiFi, Bluetooth or radio signal.

6. The integrated keyboard of claim 3, further comprising a case having connectors to tightly couple the interface of the integrated keyboard with the master/slave device.

7. The integrated keyboard of claim 3, wherein the master/slave device is coupled to a display device, and wherein the master/slave device displays an image using the motion data and the relative positions.

8. The integrated keyboard of claim 7, wherein the image is displayed under control of an application program running on the master/slave device.

9. The integrated keyboard of claim 1, wherein the keyboard comprises a keyboard with physical keys.

10. The integrated keyboard of claim 9, wherein the control unit configures the physical keys of the keyboard into a logical keyboard according to an application program running on the master/slave device.

11. The integrated keyboard of claim 10, further comprising a protector that is provided to cover the physical keys of the keyboard.

12. The integrated keyboard of claim 11, wherein characters are printed on the protector, each provided to identify a symbol mapped to each physical key.

13. The integrated keyboard of claim 11, wherein the protector is made of a transparent material selected from the group consisting of plastic, polyurethane and silicone.

14. The integrated keyboard of claim 11, wherein the protector includes one or more open ports or holes to allow a user's finger to reach exposed portions of the touch pad.

15. The integrated keyboard of claim 1, wherein keys of the keyboard are printed directly on the touch pad or on a sheet provided on the touch pad to cover the overlapping area.

16. The integrated keyboard of claim 15, wherein the sheet is made of a material selected from the group consisting of paper, plastic, and metal.

17. The integrated keyboard of claim 15, wherein the control unit configures logical keys each corresponding to the printed keys.

18. The integrated keyboard of claim 17, wherein the touch pad comprises sensing elements selected from the group consisting of resistive sensing elements, capacitive sensing elements, and surface acoustic wave sensing elements.

19. The integrated keyboard of claim 1, wherein the keyboard is selected from the group consisting of LCD displayed keyboards and ePaper displayed keyboards.

20. The integrated keyboard of claim 1, wherein the logical touch pads are configured such that a user touching the logical touch pads operate multi-touching functions.

21. The integrated keyboard of claim 1, wherein the control unit further configures logic keys on the touch pad outside of the area occupied by the keyboard.

22. The integrated keyboard of claim 21, wherein the logical keys are configured to provide up, down, left and right control keys for a cursor.

23. The integrated keyboard of claim 1, wherein the control unit further configures a logical touch pad in an area overlapping a designated key of the keyboard.

24. The integrated keyboard of claim 23, wherein the designated key is a "space" key.

25. The integrated keyboard of claim 23, wherein the control unit interprets a user's touch on (a) a top portion of the designated key as a keyboard entry that enters the symbol represented by the designated key, (b) a left portion of the designated key as indicating clicking a left mouse button, and (c) a right portion of the designated key as indicating clicking a right mouse button.

26. The integrated keyboard of claim 1, wherein the control units dynamically reconfigures the keyboard to display keys bearing any combinations of symbols selecting from the group consisting of signs, shapes, characters, printed messages, advertisement and instructions.

27. The integrated keyboard of claim 1, further comprising a projector controlled by the control unit.

28. The integrated keyboard of claim 27, wherein the projector is configured to display video, images or computer data on a surface.

29. The integrated keyboard of claim 27, wherein the projector is implemented using techniques selected from the group consisting of: Micro-Electro-Mechanical Systems (MEMS) scanning mirror, Digital Light Processing (DLP), Light Crystal over Silicon (LCOS), and Liquid-crystal display (LCD).

30. The integrated keyboard of claim 27, further comprising a virtual human interface device (HID) module controlled by the control unit.

31. The integrated keyboard of claim 30, wherein the virtual HID module is configured to provide an input device which performs a function selected from the group consisting of keyboard, mouse, trackball, touch pad, pointing stick, graphics tablet, joystick, and game pad functions.

32. The integrated keyboard of claim 30, wherein the virtual HID module is configured to provide a 3-dimensional motion tracking system.

33. The integrated keyboard of claim 32, wherein the 3-dimensional motion tracking system tracks motion of a target and provides 3-dimensional position data.

34. The integrated keyboard of claim 33, wherein the 3-dimensional motion tracking system provides motion data.

35. The integrated keyboard of claim 33, wherein the target comprises a user's finger.

36. The integrated keyboard of claim 33, wherein the 3-dimensional tracking system comprises;
a projector for projecting a light pattern on to the target; and
a sensor for detecting reflected light from the target.

37. The integrated keyboard of claim 36, further comprising a light pattern generating lens to provide the light pattern.

38. The integrated keyboard of claim 36, wherein the light pattern comprises a plurality of light sheet each being spaced apart form an immediate neighboring light sheet by a predetermined angle.

39. The integrated keyboard of claim 38, wherein the sensor detects reflected light points each resulting from one of the light sheets intersecting a point on the target.

40. The integrated keyboard of claim 39, wherein the control unit detects the 3-dimensional positions of the reflected light points.

41. The integrated keyboard of claim 40, wherein the control unit uses the detected 3-dimensional positions of the reflected light points and changes in the detected 3-dimensional positions of the reflected light points over time to interpret user input.

42. A method for providing an integrated keyboard including a touch pad; comprising:
providing a control unit to control operations of a keyboard and the touch pad;
configuring a keyboard that is located in a designated area of the touch pad, the designated area completely overlapping the touch pad; and
configuring the touch pad into one or more logical touch pads, each logical touch pad occupying an area of the touch pad that is outside the area occupied by the keyboard.

43. The method of claim 42, wherein the control unit (a) through the logical touch pads, detects a user's touch, (b) generates a motion event based on detection of the user's touch, and (b) translates the detected user's touch into motion data and one or more relative positions.

44. The method of claim 43, the integrated keyboard further comprising an interface to an external master/slave device, wherein the control unit sends to the master/slave device the motion data and the relative positions over the interface.

45. The method of claim 44, wherein the interface comprises a wireless interface.

46. The method of claim 45, wherein the control unit configures the integrated keyboard to function as a remote control unit for the external master/slave device, and wherein the wireless interface uses an infrared, WiFi, Bluetooth or radio signal.

47. The method of claim 45, further comprising providing a case having connectors to tightly couple the interface of the integrated keyboard with the master/slave device.

48. The method of claim 45, wherein the master/slave device is coupled to a display device, and wherein the master/slave device displays an image using the motion data and the relative positions.

49. The method of claim 48, further comprising displaying the image under control of an application program running on the master/slave device.

50. The method of claim 42, wherein the keyboard comprises a keyboard with physical keys.

51. The method of claim 50, further comprising configuring the physical keys of the keyboard into a logical keyboard according to an application program running on the master/slave device.

52. The method of claim 51, further comprising providing a protector that covers the physical keys of the keyboard.

53. The method of claim 52, wherein characters are printed on the protector, each provided to identify a symbol mapped to each physical key.

54. The method of claim 52, wherein the protector is made of a transparent material selected from the group consisting of plastic, polyurethane and silicone.

55. The method claim 52, further comprising including in the protector one or more open ports or holes to allow a user's finger to reach exposed portions of the touch pad.

56. The method of claim 42, wherein keys of the keyboard are printed directly on the touch pad or on a sheet provided on the touch pad to cover the overlapping area.

57. The method of claim 56, further comprising configuring logical keys each corresponding to the printed keys.

58. The method of claim 57, wherein the sheet is made of a material selected from the group consisting of paper, plastic, and metal.

59. The method of claim 57, providing on the touch pad sensing elements selected from the group consisting of resistive sensing elements, capacitive sensing elements, and surface acoustic wave sensing elements.

60. The method of claim 42, wherein the keyboard is selected from the group consisting of LCD displayed keyboards and ePaper displayed keyboards.

61. The method of claim 42, wherein the logical touch pads are configured such that a user touching the logical touch pads operate multi-touching functions.

62. The method of claim 42, further comprising configuring logic keys on the touch pad outside of the area occupied by the keyboard.

63. The method of claim 62, wherein the logical keys are configured to provide up, down, left and right control keys for a cursor.

64. The method of claim 42, further comprising configures a logical touch pad in an area overlapping a designated key of the keyboard.

65. The method of claim 64, wherein the designated key is a "space" key.

66. The method of claim 64, further comprising interpreting a user's touch on (a) a top portion of the designated key as a keyboard entry that enters the symbol represented by the designated key, (b) a left portion of the designated key as indicating clicking a left mouse button, and (c) a right portion of the designated key as indicating clicking a right mouse button.

67. The method of claim 42, further comprising dynamically reconfiguring the keyboard to display keys bearing any combinations of symbols selecting from the group consisting of signs, shapes, characters, printed messages, advertisement and instructions.

68. The method of claim 42, further comprising a projector controlled by the control unit.

69. The method of claim 68, wherein the projector is configured to display video, images or computer data on a surface.

70. The method of claim 68, wherein the projector is implemented using techniques selected from the group consisting of: Micro-Electro-Mechanical Systems (MEMS) scanning mirror, Digital Light Processing (DLP), Light Crystal over Silicon (LCOS), and Liquid-crystal display (LCD).

71. The method of claim 42, further comprising providing a virtual human interface device (HID) module controlled by the control unit.

72. The method of claim 71, further comprising configuring a virtual HID module to provide an input device which performs a function selected from the group consisting of keyboard, mouse, trackball, touch pad, pointing stick, graphics tablet, joystick, and game pad functions.

73. The method of claim 72, further comprising configuring the virtual HID module to provide a 3-dimensional motion tracking system.

74. The method of claim 73 wherein, in the 3-dimensional motion tracking system, tracking motion of a target and providing 3-dimensional position data.

75. The integrated keyboard of claim 74, wherein the target comprises a user's finger.

76. The method of claim 74, wherein the 3-dimensional tracking system comprises;
a projector for projecting a light pattern on to the target; and
a sensor for detecting reflected light from the target.

77. The method of claim 76, further comprising generating the light pattern using a light pattern generating lens.

78. The method of claim 77, wherein the light pattern comprises a plurality of light sheet each being spaced apart form an immediate neighboring light sheet by a predetermined angle.

79. The method of claim 76, wherein the sensor detects reflected light points each resulting from one of the light sheets intersecting a point on the target.

80. The method of claim 79, further comprising detecting detects the 3-dimensional positions of the reflected light points.

81. The method of claim 80, further comprising using the detected 3-dimensional positions of the reflected light points and changes in the detected 3-dimensional positions of the reflected light points over time to interpret user input.

82. The method of claim 73, wherein the 3-dimensional motion tracking system provides motion data.

* * * * *